United States Patent [19]

Gautheron

[11] Patent Number: 5,301,414
[45] Date of Patent: Apr. 12, 1994

[54] PROCESS FOR SHAPING A REINFORCEMENT ON THE EXTREMITIES OF THE INTERNAL CASING OF AN ELASTIC JOINT, AFTER MOLDING, AND ITS APPLICATIONS

[75] Inventor: Michel Gautheron, Nevers, France

[73] Assignee: Caoutchouc Manufacture et Plastiques, Versailles Cedex, France

[21] Appl. No.: 916,391

[22] Filed: Jul. 20, 1992

[30] Foreign Application Priority Data

Jul. 23, 1991 [FR] France .................. 91 09405
Dec. 11, 1991 [FR] France .................. 91 15484

[51] Int. Cl.[5] ............................................. B21D 35/00
[52] U.S. Cl. ........................................ 29/451; 29/446;
29/512; 29/469.5; 72/370
[58] Field of Search ................. 72/367, 370; 29/446,
29/469.5, 509, 512, 451

[56] References Cited

U.S. PATENT DOCUMENTS

| | | | |
|---|---|---|---|
| 3,768,289 | 10/1973 | Mink | 72/67 |
| 4,452,063 | 6/1984 | Sebastiani et al. | 72/367 X |
| 4,845,972 | 7/1989 | Takeuchi et al. | 72/370 |
| 4,923,226 | 5/1990 | Bartholomew | 29/451 X |

FOREIGN PATENT DOCUMENTS

| | | |
|---|---|---|
| 0014570 | 8/1980 | European Pat. Off. . |
| 827020 | 4/1938 | France . |
| 1119841 | 6/1956 | France . |
| 1415871 | 10/1964 | France . |
| 394723 | 12/1965 | France . |
| 7010858 | 12/1972 | France . |
| 7713152 | 12/1978 | France . |
| 59-206136 | 11/1984 | Japan . |
| 871864 | 10/1981 | U.S.S.R. .................. 72/367 |

OTHER PUBLICATIONS

Donald R. Dreger, "Noiseless Cold Forging," Machine Design, Jan. 10, 1974, pp. 107-109.

Primary Examiner—Joseph M. Gorski
Attorney, Agent, or Firm—Thomas N. Ljungman

[57] ABSTRACT

A method for the manufacture of an elastic joint, which includes positioning an external casing member, an internal casing member and an elastomeric compound such that the external casing member surrounds the internal casing member, and such that the elastomeric compound is situated between the exterior surface of the internal casing member and the interior surface of the external casing member, and radially expanding an end portion of the internal casing member to thereby form an annular reinforcement on the end portion of the internal casing member, the step of radially expanding the end portion of the internal casing member being carried out by contacting a die member a plurality of times with the end portion of the internal casing member, the step of contacting the die member a plurality of times with the end portion of the internal casing member being carried out such that the force applied by the die member against the end portion of the internal casing member is exerted along different axes relative to the end portion of the internal casing member at different times.

16 Claims, 5 Drawing Sheets

PROCESS FOR SHAPING A REINFORCEMENT ON THE EXTREMITIES OF THE INTERNAL CASING OF AN ELASTIC JOINT, AFTER MOLDING, AND ITS APPLICATIONS

BACKGROUND OF THE INVENTION

1. Field of the Invention

This invention relates to the fabrication of elastic joints utilizing the bonding of an elastomer compound ring to two rigid coaxial armatures, one of which, during assembly, will be fastened to a fixed shaft, around which the other armature will swivel. The fabrication process applies a shaping to the armature destined to be fastened, by cold deformation of the material, which improves its axial crushing strength during bolting, along the axis of the fixed shaft to which the one of the two armatures is fastened.

2. Description of the Prior Art

For cylindrical elastic joints realized according to the prior art, two types of processes are used to achieve the bonding of an elastic ring between two rigid, coaxial tubular casings.

The first process consists of an assembly, under high prestress, of a ring of essentially constant thickness, made of vulcanized rubber, forcibly introduced between two necessarily cylindrical rigid elements, by means of a coupling press, as disclosed in document French Patent No. 1,119,841 (issued to Silentbloc).

The other process which uses adherization achieving an intimate physicochemical bond during reticulation of the elastomer compound between the elastomer compound and the rigid metal or plastic rings which surround it—the adherization being simultaneous with the molding of an elastic joint—has become the most widely used means for the realization of all types of elastic joints. For the simplest cylindrical coupling sleeves, designed for the angular movement of a vehicle suspension arm, for example, this process is described in French Patent No. 827,020 (issued to Metalastik).

Current practice is to improve the resistance to alternating fatigue (e.g., the alternating fatigue strength) of the elastomer by precompressing the elastic ring, by means of the swelling or expansion of the internal casing, or by radially hammering the external ring, as described, by way of example, in French Patent No. 1,415,871 (issued to Metalastik), which applies to cylindrical rings or rings having a partly spherical surface.

In both types of realization processes, the elastic ring is in a condition of major multidirectional compression, and the only zones where failure can occur are the exposed surfaces which are in contact with the atmosphere on the lateral edges of the elastic sleeve. An appropriate shape is given to this exposed surface so that it can resist rotational deformation, and the translation movements due to the axial elasticity. The two coaxial rings are parts which are included in the automobile manufacturers, attempts to reduce the weight of their vehicles. To achieve such a weight reduction, the exterior ring is sometimes made of plastic material. With regard to the internal casing, which continues to be made of metal and is fastened by axial tightening when bolted to the frame or the mounting, which connects it firmly to the joint shaft of the arm in question, it is no longer satisfactory to leave it a simple, thin metal tube, most frequently made of ordinary drawn steel.

The automobile manufacturer, who applies a torque to a steel screw which is generally of a better grade than the steel in the casing, will have a tendency to give the casing an annular cross section larger than that of the screw, which passes through the hole in its center. This results in a ratio between the outside and inside diameters of this metal casing which is at least equal to the square root of two.

The drawing of the metal also results in a work hardening of the material from which this tube is made, and the two components of the fastening are then stronger than the fastening member itself.

Thus the initial deformations during the tightening procedure effect the sheet metal blank, which is pressed against the end planes of the internal casing, which are also stressed by the head of the screw and the nut on the external surface of this blank.

Over time, the dynamic stresses exerted by the joint flatten this contact surface, where the risks of loosening are concentrated. The most economical solution consists of increasing the contact surface on the end plates of the internal casing, without having to improve the quality of the material.

To avoid an unnecessary increase in the weight of the internal casing, but primarily to leave space in the functionally useful part for the maximum possible thickness of the elastomer compound—which makes possible the deformation of the part as well as the antivibration function required of it—the internal casing becomes a tube of modulated variable thickness. It is normally, therefore, provided with a reinforcement (usually an extra thickness) on the lateral contact surfaces, and a lower and constant thickness in the central portion, or it follows an optimized law for the progression of the thickness over the entire piece, to achieve greater resistance to buckling during axial tightening.

The conventional processes for the realization of such casings often include the clamping of an additional washer, or a cutting (or undercutting) process with the removal of shavings. One disadvantage of these processes is that they are expensive. Deformation of the material is a more advantageous means, but is complicated by the existence of the internal hole. The cold deformation during rotation by the creep or extrusion of material is generally called "rotary extrusion" (sometimes referred to as "hydrospinning"). Examples of rotary extrusion devices are disclosed in French Patent No. 2,100,579 (issued to Messerschmidt-Boelkow-Blohm), which discloses a fixed milling tool and a hydromechanical drive, and in French Patent No. 2,389,428 (issued to the French Government), which discloses the rotary extrusion of conical parts using a single milling tool, balanced by the flange acting as a support on the blank.

A machine using a riveting die with conical movement around the zone where the material deformation is concentrated is disclosed in U.S. Pat. No. 3,768,289 (issued to VSI Corporation). This machine is, however, intended for shaping rivet heads and not for shaping hollow parts.

Orbital forging and riveting technology is discussed in "Noiseless Cold Forging", *Machine Design*, Jan. 10, 1974 authored by Donald R. Dreger.

OBJECT OF THE INVENTION

One object of the present invention is to make possible the shaping, after molding, of at least one of the end surfaces of a rigid internal casing of a composite part, by cold plastic deformations of the metal, and by employing a local radial deformation process, using spot pressure, in a rotary and continuous manner, applied to the extremities of the hole in the finishing phase, in a manner compatible with the components which surround the rigid internal casing.

SUMMARY OF THE INVENTION

In general, the invention includes a process for shaping, after molding, at least one of the extremities of a rigid internal casing of an elastic joint, the function of which is achieved by deformation of an elastic, cylindrical, or essentially cylindrical sleeve, made of an elastomer compound and intimately bonded to the rigid internal casing and to an external ring which is coaxial with the rigid internal casing.

The invention also includes an elastic joint resulting from the process of shaping, after molding, at least one of the extremities of the rigid internal casing of the elastic joint.

A process according to the invention is characterized, in one aspect, by the fact that an annular reinforcement is formed on at least one of the extremities of the rigid internal casing. The zone of the rigid internal casing to be deformed is enclosed in two half-dies which determine its external shape. The force which causes the local creep or extrusion flow is applied tangentially by a forging die rocking around an oblique axis having a low-angle conical trajectory, which axis rotates around the axis of revolution of the elastic joint. Additionally, a reaction is exerted on the rigid internal casing by the unfinished planar surface on its opposite extremity, without applying any significant stress to the elastomer compound constituting the elastic sleeve.

One variant of a shaping process according to the invention is characterized by the fact that the shape of at least one of the planar end surfaces of the rigid internal casing is supplemented by at least one projecting element consisting of a projecting cylindrical rib or radial grooves in relief, corresponding to circular or radial outlines incised into the slightly conical surface of the die. Such a projecting element is intended to improve the resistance of the elastic joint to radial or rotational forces exerted on the planar contact surface during the fastening of the rigid internal casing after assembly.

The elastic joint according to the invention is characterized by the fact that its rigid internal casing has, on at least one of its extremities, annular reinforcements realized after molding in accordance with the inventive shaping process.

In one alternative embodiment of the invention, the elastic joint has an intermediate armature, and the outside diameter of the annular reinforcement is greater than the diameter of the intermediate armature.

In another alternative embodiment of the elastic joint according to the invention, at least one of the planar end surfaces of the rigid internal casing has at least one projecting element, such as a projecting cylindrical rib or a projecting radial groove.

In summary, one feature of the invention resides broadly in a method for the manufacture of an elastic joint, the elastic joint including an internal casing member, the internal casing member having an exterior surface, an interior surface defining a throughgoing bore passing through the internal casing member and a central axis, the elastic joint also including an external casing member, the external casing member having an exterior surface, an interior surface defining a throughgoing bore passing through the external casing member and a central axis, and the elastic joint also including an elastomeric compound positioned between the exterior surface of the internal casing member and the interior surface of the external casing member, the method for the manufacture of the elastic joint comprising the steps of positioning the external casing member, the internal casing member and the elastomeric compound such that the external casing member at least partially surrounds the internal casing member and such that the elastomeric compound is situated between the exterior surface of the internal casing member and the interior surface of the external casing member; and radially expanding an interior portion of an end portion of the internal casing member to thereby form an annular reinforcement on the end portion of the internal casing member, the step of radially expanding the interior portion of the end portion of the internal casing member being carried out by contacting an internal die member at a plurality of positions at different times with the interior portion of the end portion of the internal casing member.

Another feature of the invention resides broadly in an elastic joint, the elastic joint comprising an internal casing member, the internal casing member having an exterior surface, an interior surface defining a throughgoing bore passing through the internal casing member and a central axis; an external casing member, the external casing member having an exterior surface, an interior surface defining a throughgoing bore passing through the external casing member and a central axis; the internal casing member and the external casing member being coaxial such that the external casing member at least partially surrounds the internal casing member thereby forming a space between the exterior surface of the internal casing member and the interior surface of the external casing member; an elastomeric compound situated in the space formed between the exterior surface of the internal casing member and the interior surface of the external casing member; an annular reinforcement formed on an end portion of the internal casing member, the annular reinforcement comprising a radial expansion of the end portion of the internal casing member; and a substantially annular end face extending between the exterior and interior surfaces of the internal casing member; the elastic joint being manufactured according to the process comprising the steps of: positioning the external casing member, the internal casing member and the elastomeric compound such that the external casing member at least partially surrounds the internal casing member and such that the elastomeric compound is situated between the exterior surface of the internal casing member and the interior surface of the external casing member; and radially expanding an interior portion of the end portion of the internal casing member to thereby form the annular reinforcement on the end portion of the internal casing member, the step of radially expanding the interior portion of the end portion of the internal casing member being carried out by contacting an internal die member at a plurality of positions at different times with the interior portion of the end portion of the internal casing member.

Yet another feature of the invention resides broadly in a method for forming an annular reinforcement on an end portion of a casing member such as is used in the manufacture of an elastic joint, the casing member having an exterior surface, an interior surface defining a throughgoing bore passing through the casing member and a central axis, the method comprising the steps of: contacting an internal forging die member a plurality of times with an interior portion of the end portion of the casing member, the internal forging die member contacting substantially only the interior portion of the end portion of the casing member; the step of contacting the internal forging die member a plurality of times with the interior portion of the end portion of the internal casing member being carried out such that the force applied by the internal forging die member against the interior portion of the end portion of the internal casing member is exerted along different axes relative to the end portion of the internal casing member at different times; and wherein the application of force of the internal die member against the interior portion of the end portion of the internal casing member is along an axis that is oblique and that has a low-angle conical trajectory with the central axis of the internal casing member such that the internal forging die makes a spot contact that is tangential with the interior portion of the end portion of the internal casing member.

BRIEF DESCRIPTION OF THE DRAWINGS

The invention is described in greater detail below, reference being made to the accompanying drawings, wherein:

FIGS. 6a, 6b and 6c show various shapes which can be realized, as required, on the end portions of the internal casings, wherein:

FIG. 6a shows the shape most frequently requested;

FIG. 6b shows a shape exhibiting compression toward the interior of the internal casing; and FIG. 6c shows a compromise between the two extremes of FIGS. 6a and 6b;

DESCRIPTION OF THE PREFERRED EMBODIMENTS

Figure 1:
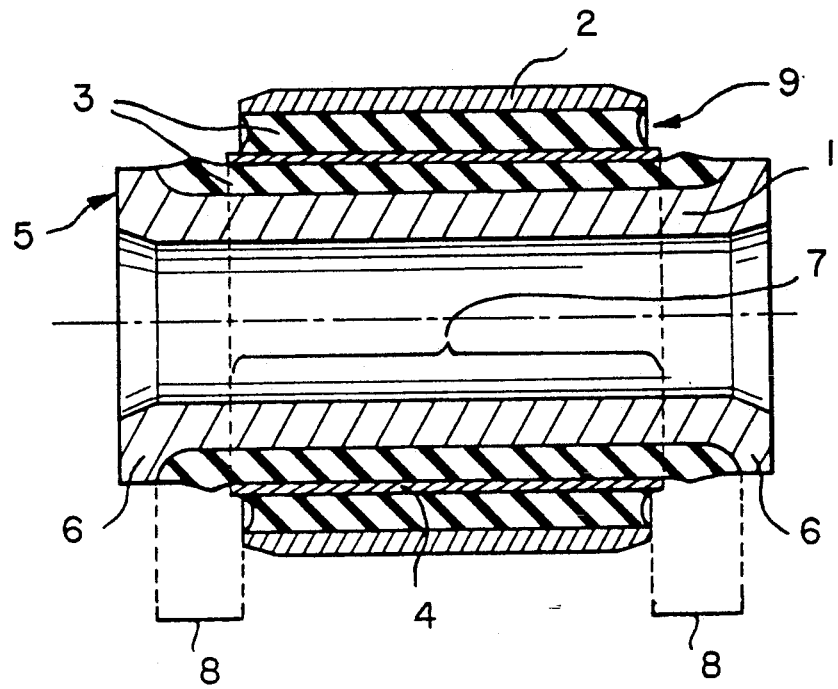
FIG. 1 is a cross-sectional view of an elastic joint realized according to the prior art.

FIG. 1 is an axial sectional view through an elastic joint realized in accordance with the prior art. To meet the requirements of the automobile manufacturers, the rigid internal casing 1 must normally be realized in the shape of a metal tube of variable thickness, coaxial with an external ring 2 made of a metal or plastic material. The elastic sleeve 3 is intimately bonded, normally through vulcanization in a closed mold under controlled pressure and temperature, to the rigid internal casing 1, on one hand, and to the external ring 2 on the other hand, by means of their opposed surfaces.

Optionally, an intermediate armature 4 made of a thin steel tube, which must be placed over the rigid internal casing 1 during assembly, is added in order to essentially increase the radial rigidity of the elastic joint, without significantly interfering with the torsional rigidity or with the elasticity along the axis of the elastic joint.

In order to increase the contact surface on the planar end surfaces 5, the rigid internal casing 1 is normally provided with two annular reinforcements 6, which are of increased radial dimensions in relation to the central portion 7, which has an externally cylindrical surface facing the elastic sleeve 3. To realize an easy and highly productive molding, the elastic sleeve 3 has its extreme portions 8, of necessity, molded in a cylindrical fashion within the radial extension of the outside diameter of the annular reinforcements 6. The two parts of the mold which form the lateral surfaces 9—and where the material of the elastic sleeve 3 is injected—have therefore, in this region, been reduced to the minimum taper, and have a practically cylindrical shape, so that they can be moved away from one another by axial displacement when the mold is opened and the pieces are extracted.

An improvement of the alternating fatigue strength is almost always achieved by prestressing, in some manner, the elastomer compound of the elastic sleeve 3. A mechanical radial hammering by means of a press, or often a simple passage through an extrusion die, may be employed to reduce the diameter of the external ring 2.

Likewise, when there is an intermediate armature 4, embedded in the elastomer compound, and consequently to which no deformation can be applied, the interior portion of the elastic sleeve 3, i.e., the portion between the rigid internal casing 1 and the intermediate armature 4, may be prestressed by the passage of a mandrel through the rigid internal casing 1, or by a similar expansion of the rigid internal casing 1, which increases all the diameters (inside and outside) of the rigid internal casing 1 and of its annular reinforcements 6. On account of the volumetric incompressibility of the elastic sleeve 3, the result is a slight swelling of the extreme parts 8 which were realized in a cylindrical shape.

When functional deformations occur, in particular when axial elasticity is used to allow dynamic movements of several millimeters along the axis of the piece, the cylindrical shape and to a greater extent this resulting swelling, turn out major disadvantages.

This is due to the fact that the zone consisting of the extreme portions 8 is the most highly stressed zone of the elastomer compound, and the automobile manufacturer using this type of part will often require the manufacturer to perform a undercutting behind the annular reinforcements 6 to produce a thereon which are free of all material, thus allowing the movement of the intermediate armature 4 both under axial forces and during so-called conical deformations. The solutions used in the prior art include the performance of a machining operation following molding, or the installation of a stationary ring, but such solutions make the mold, the molding, the unmolding and the post unmolding operations very complex. The proposed invention provides an advantageous solution which overcomes these drawbacks.

Figure 2:
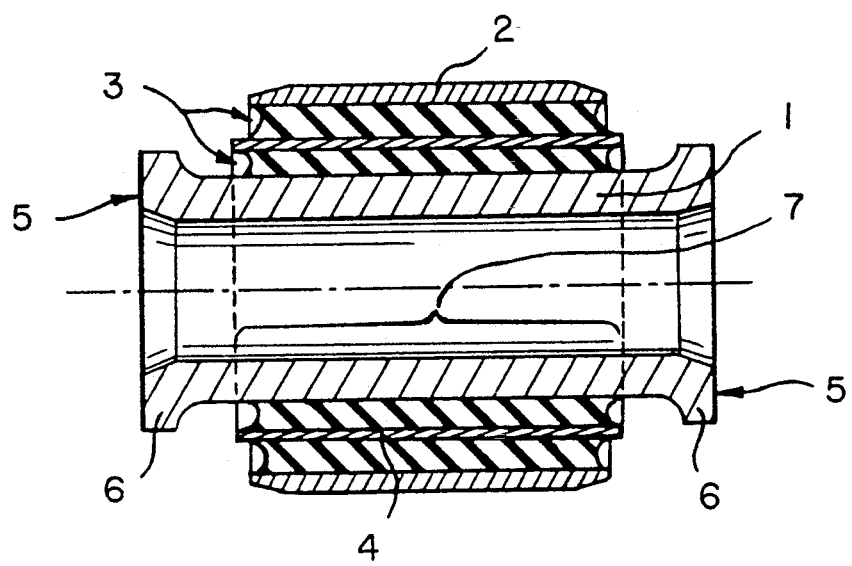
FIG. 2 is a cross-sectional view of an elastic joint according to the invention, finished as desired by an automobile manufacturer.

FIG. 2 is an axial section of a finished elastic joint, realized according to the process of the present invention, and having the shape discussed above which is desired by the automobile manufacturers.

Having a generally cylindrical shape the piece has a basically similar appearance to a piece manufactured according to the prior art illustrated in FIG. 1.

The external ring 2 is coaxial with the rigid internal casing 1, to which it is connected by means of the elastic sleeve 3, which can be optionally reinforced by means of an intermediate armature 4, which increases the radial rigidity.

The annular reinforcements 6 on either side of the essentially cylindrical central portion 7 make it possible to achieve the desired increase of the contact surface area, thanks to the existence of the planar end surfaces 5.

In contrast to the prior art, the shaping process of the present invention makes it possible to give the annular reinforcements 6 an outside diameter which is greater than that of the intermediate armature 4, an arrangement which can be advantageous when high form factors are desired. It is possible to obtain these shapes directly by deformation of the material from which the rigid internal casing 1 is made, starting from the shape of a molded blank as illustrated in FIG. 3.

Figure 3:
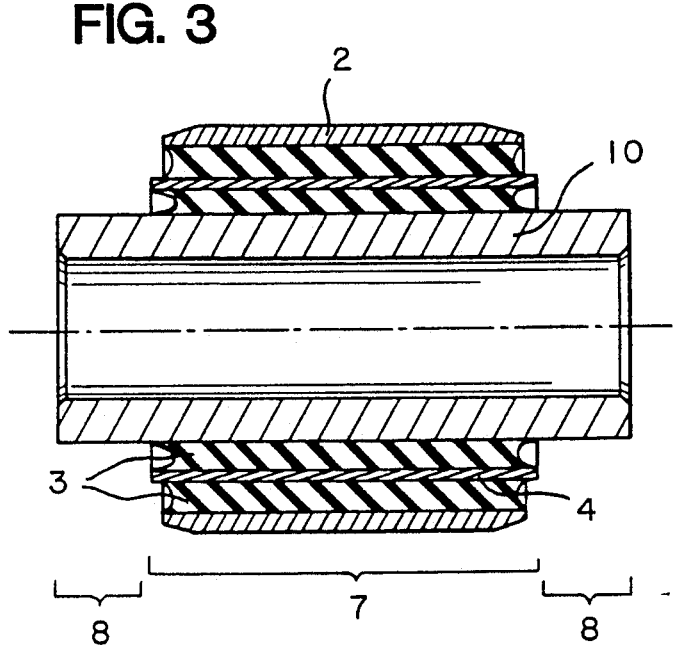
FIG. 3 is a cross-sectional view of the same elastic joint shown in FIG. 2, as it appears following molding.

FIG. 3 is an axial section of an elastic joint according to the present invention as it exits from a molding operation, and before any finishing operation.

It differs from the elastic joints known in the prior art and from the finished part described in FIG. 2, in that the unfinished internal casing 10 is cylindrical over its entire length, and the straight sections retain inside and outside diameters which are approximately the same as those of the central portion 7. More precisely, these latter two diameters may be slightly increased by a tube expansion operation, assuming that there is an intermediate armature 4.

The expansion applies a prestress by the reduction of the radial thickness of the elastic sleeve 3. In the absence of an intermediate armature 4 which, embedded in the elastomer compound, cannot change its dimensions, a radial hammering exerted on the external ring 2 suffices to apply the desired prestress. With or without subsequent expansion, the elastic joint, during molding, has cylindrical extreme portions 8 which make it possible to simplify the construction of the mold used for its manufacture. The mold may be opened by a relatively simple axial displacement, thanks to a practically zero taper, since the mold has only to move past a thin layer of elastomer compound, which may possibly coat the cylindrical surface of the unfinished internal casing 10 extreme portions 8, to thereby protect it against the risk of oxidation.

Figure 4:
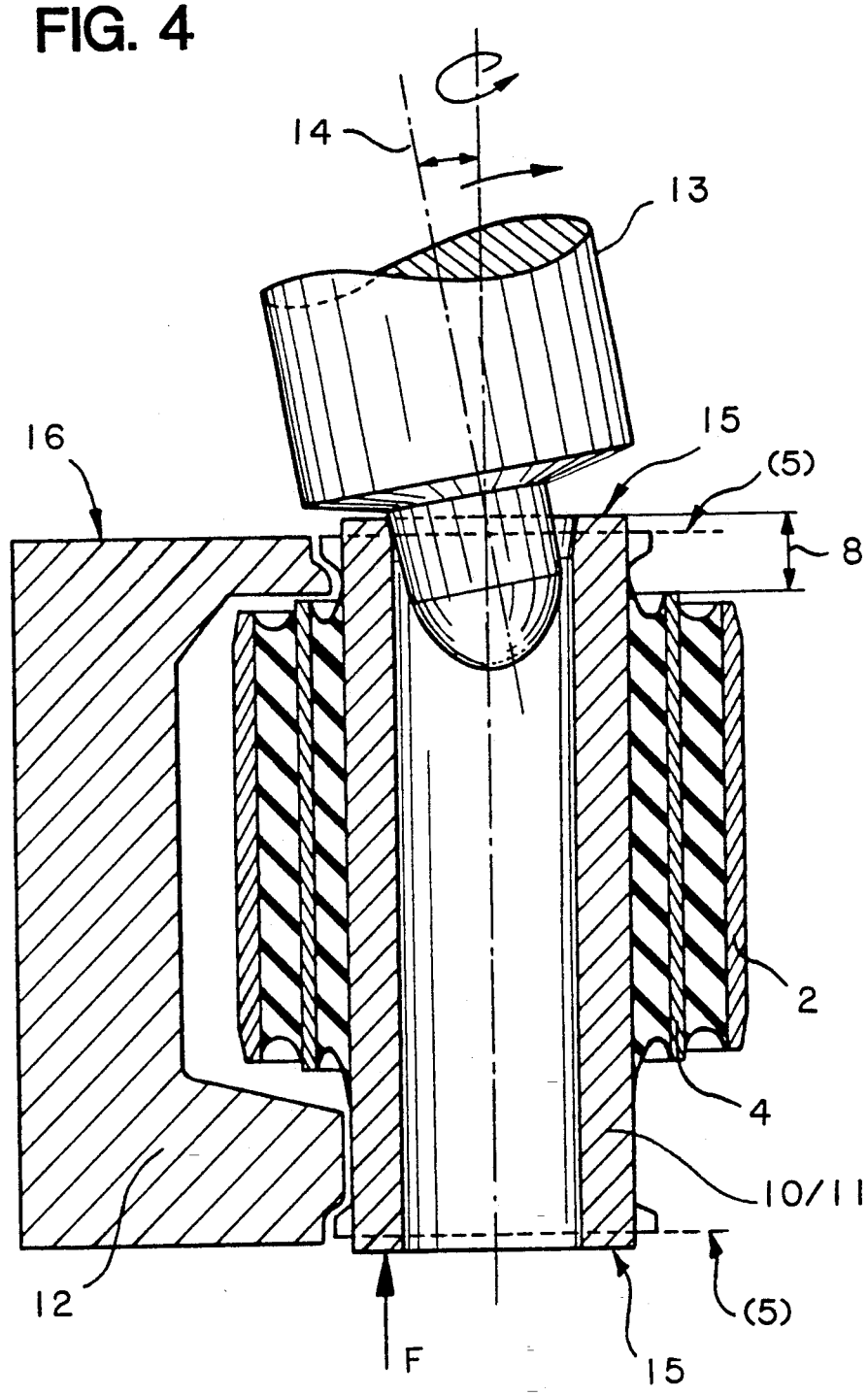
FIG. 4 shows, in an axial section having a vertical axis, the relative positions of a forging die tool and the elastic joint during a shaping operation.
Figure 4A:
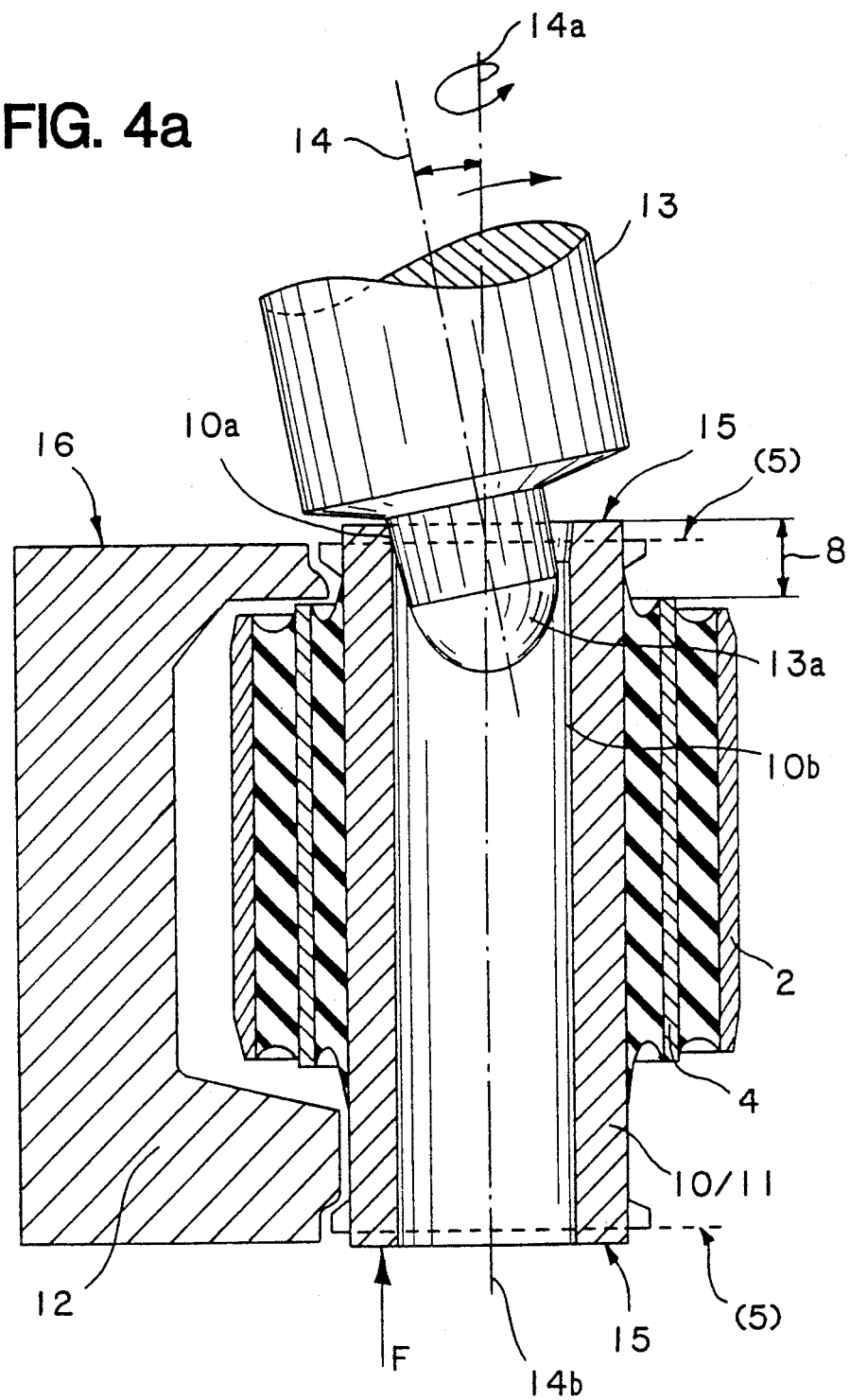
FIG. 4a is essentially the same as FIG. 4 with additional features of the invention indicated thereon.

FIGS. 4 and 4a show, in an axial cross section with a vertical axis, the relative positions of a die and an elastic joint during the shaping operation. The elastic joint which, after molding, has undergone the radial hammering of the external ring 2 and, optionally, the expansion which changes the inside and outside diameters of the unfinished internal casing 10, bringing them to the values of the expanded internal casing denoted by reference numeral 11, is enclosed between two half-dies 12. To carry out the plastic deformation of the metal, the half-dies 12 are in local contact with the extreme cylindrical portions 8 of the expanded internal casing 11.

The forming machine, which, in a particularly preferred embodiment of the invention, is derived from a riveting machine, includes a revolving forging die 13 (also referred to herein as an "internal die member"), which is mounted such that it turns freely around an oblique axis 14. This motion by the die 13 is similar to the motion of the die in the article entitled "Noiseless Cold Forging" in *Machine Design*, published on Jan. 10, 1974, starting at page 107. The die 13 is rotated by the contact between the die 13 and the internal casing 10 such that at the point of contact 10a between the die 13 and the internal casing 10, the die 13 is stationary with respect to the internal casing 10. In other words, the cross section of the die is designed so that there is a spot tangential contact 10a on an unfinished plane surface 15 cut on the edge of the expanded internal casing 11. The resulting short contact line is moved in the plane containing the oblique axis 14, when it turns around the vertical axis of the machine. The forging die 13, which rotates freely, thus rolls without sliding over its tangential contact surface. Referring to FIG. 4a, therefore, the die 13 appears to precess like a top about an axis 14a which is preferably aligned or parallel to a central axis 14b of the internal casing 10.

Enormous pressures can be exerted locally, without a significant energy supply, on the sole condition that the molded blank is buttressed by a supporting reaction force F on its opposite unfinished planar surface 15. The shaping of a second reinforcement, if any, on the other extremity of the expanded internal casing 11 can subsequently take place, after turning the casing around, by applying the supporting reaction force F to the finished first surface. In the operation thus described, the major forces exerted during the plastic deformation of the metal do not travel through the high axial flexibility of the elastic joint.

The half-dies 12 enclose in a precise manner each end portion 8, and thereby impose the desired shape on the material (in general a semi-hard steel) of the expanded internal casing 11, without exerting an axial reaction.

In one alternative embodiment of the invention the forging machine has an elastically variable inclination of the oblique axis 14. Under the action of the reaction, the oblique axis 14 is straightened and the resulting conicity of the contact line thus adds a component of force, exerted toward the exterior on the metal, which is radially forced to expand in the die which surrounds it. After this compression of material, the tangential contact line is straightened and comes back to be located in the plane of the planar end surface 5 which replaces the initial unfinished plane surface 15, but which is recessed by a few millimeters therefrom. The planar end surface 5 can advantageously be flush with the upper surface 16 of the half-dies used, the reaction force F then being exerted on the planar end surface 5 of the rigid internal casing 1 and not on the plane constituting the surface of the half-dies 12. The operation on the opposite surface is performed by turning the half-dies 12 over, the reaction force F then being exerted on the first, finished planar end surface 5.

Figure 5:
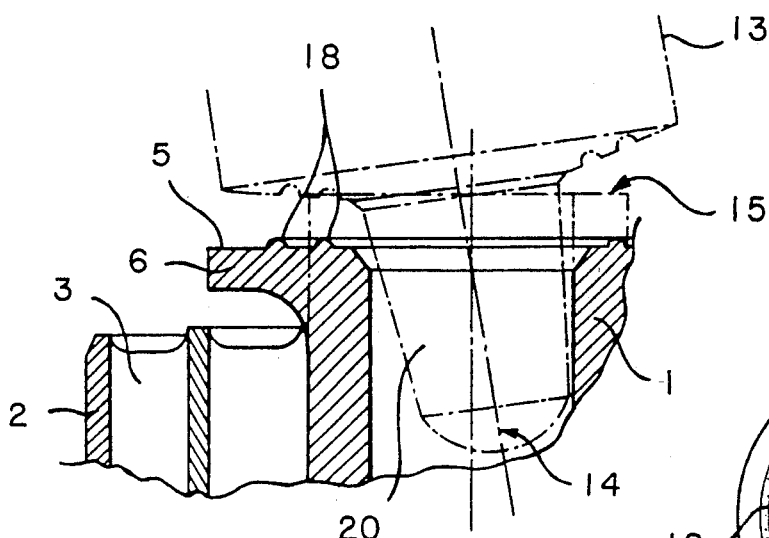
FIG. 5 is a partial axial sectional view of an elastic joint being finished by treatment with the forging die tool, the elastic joint having at least one projecting element on one of its end surfaces.

FIG. 5 illustrates an alternative embodiment of the process which can be applied to the planar end surface 5 of the rigid internal casing 1 of an elastic joint to improve the fastening of the elastic joint to the sheet metal blanks against which the joint is tightened, during installation by means of bolts, the variation including equipping the planar end surface 5 of the rigid internal casing 1 with at least one projecting element.

Nothing in the operation of the forging die 13 prevents its conical surface from being equipped with incisions or grooves, the conical surface being at a low angle in relation to a plane which rotates tangentially without friction along a short contact line on the plane of the unfinished planar surface 15, which becomes, under the effect of the deformation, a slightly recessed end planar surface 5. The contact line rotates in a plane defined by the oblique axis 14, but without radial or circumferential friction, itself generating a plane where the outline of the imprints corresponding to those cut into the forging die 13 can remain marked, to form at least one projecting element.

Figure 6A:
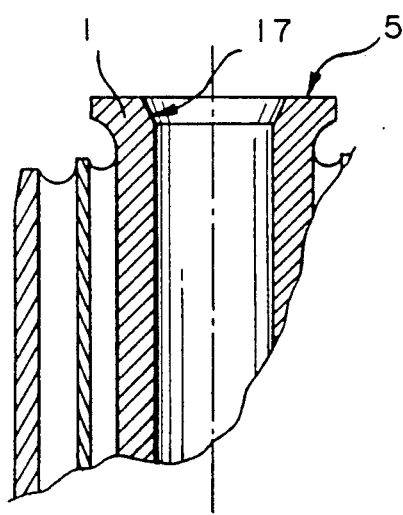
Figure 6B:
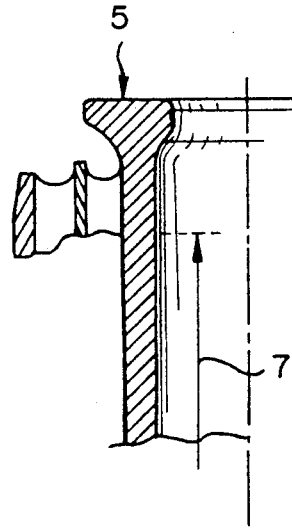
Figure 6C:
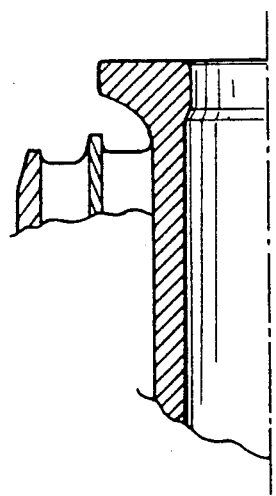

FIGS. 6a, 6b and 6c show various shapes which can be produced, as required, on the end faces of the rigid internal casings 1.

FIG. 6a shows the shape most frequently requested by the automobile manufacturers. The rigid internal casing 1 has a bevel 17 which facilitates the introduction of an assembly screw. The bevel increases the contact surface on the planar end surface 5, which is the objective, while maintaining an essentially constant thickness of the rigid internal casing 1. The material is thus stressed under the optimum conditions to reduce the risk of buckling during axial tightening.

FIG. 6b shows a shape in which the planar end surface 5 has an increased area, both toward the outside and toward the boring, produced by compression of materials in the direction of the shaft. The reduction of the diameter of the boring thus created remains manageable, to allow passage of a screw in the boring, thanks to the shape given to the extremity of the forging die engaged in the hole. Referring to FIG. 4a, a possible configuration of the die 13 which would form the configuration of FIG. 6b would be a die 13 with an elongated distal portion 13a which would extend to make contact with the inner wall 10b of the internal casing 10, which is disposed on the right of FIG. 4a, to thereby deform this inner wall 10b to at least initially form at least preliminary steps in the formation of the configuration of FIG. 6b.

The resulting shape is one means of optimizing the resistance to buckling of the tubular shape of the rigid internal casing 1, on the hypothesis that the central portion 7 does not remain strictly cylindrical, but has a modulated variable thickness, to reduce the risk of buckling.

FIG. 6c shows a shape which represents a compromise between the two extreme shapes of FIGS. 6a and 6b, and which may be the most desirable to satisfy a number of objectives. Nothing would prevent the finishing operations from being performed in reverse order, in which the expansion could be performed after the shaping of the annular reinforcements 6, having the shapes illustrated in FIG. 6b.

The cylindrical passage necessary for the assembly screw is then reestablished following the subsequent expansion operation on the annular reinforcement.

Figure 7:
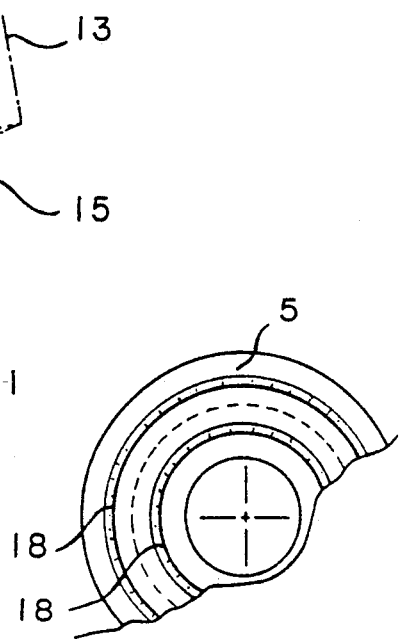
FIG. 7 is an end view of the planar end surface of an internal casing, the end surface having two projecting cylindrical ribs constituting the projecting element.

Like FIG. 5, FIG. 7 shows, in axial section and in an end view, the situation in which a projecting element on the end surface of the rigid internal armature 1 with an annular reinforcement 6 is constituted by two small projecting cylindrical ribs 18 marked in relief in relation to the planar end surface 5 of the rigid internal casing 1. The intersection of the axis of revolution of the elastic joint (and of the machine) retains during this rotation the same center for the imprint marked on the forging die 13, and for the corresponding outline. Therefore, the planar end surface 5 receives at least one projecting cylindrical rib 18, and preferably two, as shown. Their cross sections can be triangular, for example, with rounded peaks and corners, and the reinforcement can project up to 0.5 mm in relation to the planar end surface 5.

Upon subsequent fastening, during assembly, an elastic tightening covering a stroke length of at least this value will imprint the outline of this projecting cylindrical rib 18 in the facing sheet metal blank to which the elastic joint is attached, the hardness of which is generally less than that of the rigid internal casing 1.

Thus the radial forces applied to the elastic joint, which would be capable of causing, with repetitive fatigue, a displacement of the shaft, with a bruising in its boring, are much better contained, even in case of a defective tightening of the axial bolt, by the localization of the stresses as a result of this creation of support points resistant to the forces parallel to the surface.

Extraordinarily exaggerated rotational movements also allow for a rebalancing of the stresses in the elastic joint, if necessary, without modification of the geometry of the suspension system in question, when the elastic joint recenters its orientation on an average value in relation to the dynamic movements, thanks to a slight slipping of the projecting cylindrical ribs 18 in their outlines on the sheet metal blank.

Figure 8:
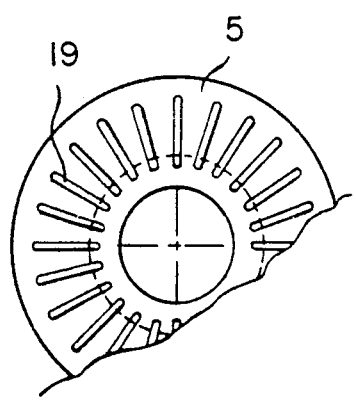
FIG. 8 is an end view of a similar planar end surface, with grooves constituting a variant of the projecting element.

FIG. 8, on the other hand, illustrates a case in which the designer wishes to prevent any rotation of the elastic joint fastened by its rigid internal casing 1 when the axial tightening becomes insufficient. The projecting element is then constituted by radial grooves 19 in relief located along the generatrices. For this purpose, they are marked on the metal of the rigid internal casing 1 by the hollow imprints on the slightly conical surface of the forging die 13. These imprints are impressed during the rotation of the short contact line in the plane defined by the oblique axis 14 which rotates around the geometric axis of the part.

These radial grooves 19 in relief, 0.3 to 0.4 mm thick, can be impressed, like the projecting cylindrical ribs 18, during axial tightening upon assembly, into the facing sheet metal blank. The resistance to rotation, like the resistance to radial forces, is thereby significantly improved, even under low axial tightening.

The imprints of the two types of projecting elements, sunk into the very hard metal of the forging die 13, can be obtained by grinding during the fabrication of the forging die 13, and thus appear in relief on the planar end surface 5 of the rigid internal casing 1.

Figure 9A:
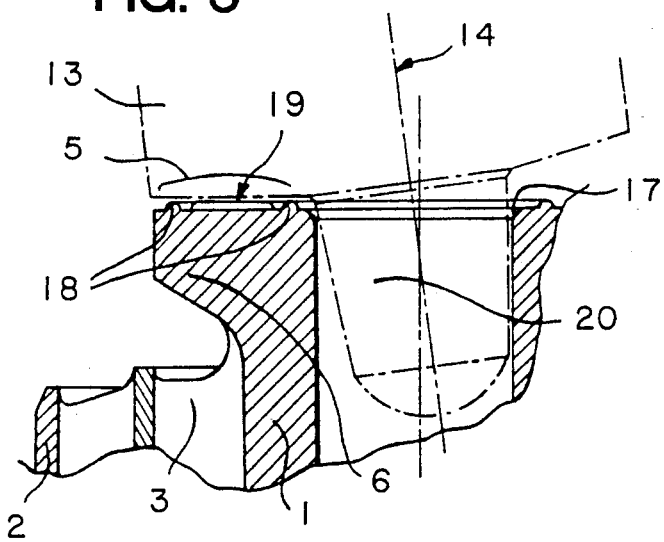
FIGS. 9a and 9b are a cross-sectional view and an end view of an embodiment combining the two preceding projecting elements shown in FIGS. 7 and 8.
Figure 9B:
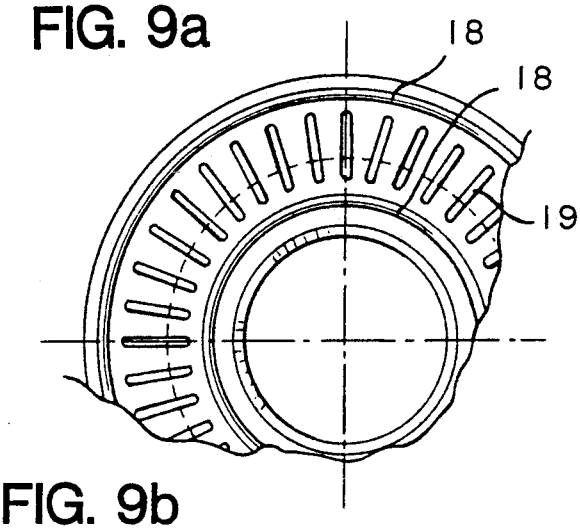

FIGS. 9a and 9b, in two perpendicular planes, are respectively an axial section and an end view of a combination according to the two variants which have just been described.

At least one projecting cylindrical rib 18, or preferably two concentric ribs, as illustrated, have a common center on the axis of the rigid internal casing 1, and also, in the annular portion located between them, there are provided radial grooves in relief 19, which reproduce the sunken imprint realized on the quasi-plane surface of the forging die 13. The forging die 13 is in all cases centered and held on the axis of the elastic joint by the existence on its extremity of a slightly conical stud 20.

The slightly conical movement of the oblique axis 14, by means of the slightly conical stud 20, generates a cylinder which coincides with the boring of the rigid internal casing 1.

Thus, in spite of the plastic deformations of the material, the perpendicularity of the cylinder is controlled in relation to the planar end surface 5 with the projecting cylindrical ribs 18 and the radial grooves in relief 19. The mutation of the slightly conical stud 20 in the cylinder takes place with slight surface pivoting movements which are altogether allowable, thus possibly creating a bevel 17 which is useful during bolting operations. On the other hand, the rotation (around the axis of revolution of the elastic joint) of the short contact line between the forging die 13 and the planar end surface 5 of the rigid internal casing 1 is done without slippage, making possible the reproduction on each turn of the outline left by the sunken imprints on the surface of the forging die 13.

The process for shaping the reinforcement according to the invention has the specific advantage that it can be exerted on the composite piece, already molded, without having to exert thermal or mechanical stresses on the elastic sleeve.

The inventive shaping process thus makes it possible to realize a reduction in the diameter of the molded elastomeric portions behind the annular reinforcements, e.g., "undercuttings", which are highly useful in achieving an improved distribution of the stresses of the elastomer compound.

The invention also makes possible the realization of annular reinforcements, the outside diameter of which is greater than the diameter of an intermediate armature, to thereby obtain high form factors, which is not possible using the technologies of the prior art, which require the assembly of the armatures before the molding of the elastic joint.

The variant of the molding process described for the realization of projecting elements, such as projecting cylindrical ribs or radial grooves in relief, combines the material deformation by localized creep which forms the annular reinforcement with a technology similar to that of cylindrical milling.

Finally, the invention makes possible the realization of additional projecting elements on at least one of the planar end surfaces of the rigid internal casing of the elastic joint.

The process for shaping the annular reinforcement on at least one of the extremities of an elastic joint, individually or in combination with the shaping of projecting elements on the surface of the extremity, can easily be adapted to different lengths or different diameters of casings, and the half-dies can be used to realize an entire range of elastic joints using identical rigid internal casings.

The process can be applied to different types of elastic joints, which can be cylindrical like the ones described, but which need not be cylindrical.

Projecting elements having shapes other than those described can also be used with appropriate dies. Likewise, according to the manufacturer's wishes, they can be combined or not combined on one or both planar end surfaces of the rigid internal casing 1. The combination of these shapes can result in the presence of ribs, grooves or any other projecting element, or any combination of such elements.

One feature of the invention resides broadly in a shaping process, after molding, of at least one of the extremities of the rigid internal casing 1 of an elastic joint, the function of which is provided by deformation of a cylindrical or essentially cylindrical elastic sleeve 3, intimately bonded to the rigid internal casing 1 and to an external ring 2 which is coaxial with it, the elastic joint optionally including an intermediate armature 4 embedded in the elastomer compound which constitutes the elastic sleeve 3, characterized by the fact that an annular reinforcement 6 is shaped on at least one of the extremities of the rigid internal casing 1, the zone to be deformed of the rigid internal casing 1 being enclosed in half-dies 12 which give it the external shape, the force causing a local extrusion of the material being applied tangentially by a forging die 13 rocking around an oblique axis 14 having a low-angle conical trajectory, an axis which rotates around the axis of revolution of the elastic joint, and by the fact that the reaction is exerted on the rigid internal casing 1 by its unfinished opposite plane surface 15 without applying significant stress to the elastomer compound constituting the elastic sleeve 3.

Another feature of the invention resides broadly in a shaping process, characterized by the fact that it is applied to an elastic joint after the expansion of the rigid internal casing 1, which increases its inside and outside diameters, to exert a prestress by the reduction of the thickness of the elastic sleeve 3.

Still another feature of the invention resides broadly in a shaping process, characterized by the fact that it is applied to an elastic joint without an intermediate armature, the prestressing of the elastomer compound of the elastic sleeve 3 being provided by a radial hammering of the external ring 2, the radial hammering occurring before or after the shaping of at least one of the extremities of the rigid internal casing 1.

Yet another feature of the invention resides in a shaping process, characterized by the fact that it is applied to an unfinished, molded elastic joint, including an intermediate armature 4 embedded in the elastomer compound constituting the elastic sleeve 3, an expansion operation of the unfinished internal casing 10 being performed subsequent to said shaping of at least one of the extremities of the rigid internal casing 1.

Another feature of the invention resides broadly in a shaping process, characterized by the fact that the shape of at least one of the flat end surfaces 5 of said rigid internal casing 1 is supplemented by at least one projecting element 18, 19, representing the outline of circular or radial imprints sunk into the slightly conical surface of the forging die 13, to improve the resistance to alternating forces exerted on said plane contact surface 5 during the fastening of said rigid internal casing 1 after assembly.

Still another feature of the invention resides broadly in a shaping process, characterized by the fact that the projecting element of the plane end surface 5 of said rigid internal casing 1 consists of at least one projecting cylindrical rib 18, concentric with the axis of revolution of the elastic joint, added to improve the resistance to the radial forces exerted on said plane end surface 5 of the rigid internal casing 1 during operation.

Another feature of the invention resides broadly in a shaping process, characterized by the fact that the projecting element of the plane end surface 5 of said rigid internal casing 1 is formed by radial grooves 19 in relief, to improve the resistance to the rotational forces exerted on said plane surface 5 of the rigid internal casing 1.

Yet another feature of the invention resides broadly in a shaping process, characterized by the fact that the plane end surface 5 of said rigid internal casing 1 has a combination of at least one projecting cylindrical rib 18 and radial grooves 19 in relief, to improve the simultaneous resistance to radial and rotational forces exerted on said surface 5 of the rigid internal casing 1.

Another feature of the invention resides broadly in an elastic joint characterized by the fact that its rigid internal casing 1 has, on at least one of its extremities, annular reinforcements 6 realized in accordance with the process disclosed above.

Yet another feature of the invention resides broadly in an elastic joint, characterized by the fact that its rigid internal casing 1, on at least one of its extremities, has annular reinforcements 6, the outside diameter of which exceeds the diameter of the intermediate armature 4.

Still another feature of the invention resides broadly in an elastic joint, characterized by the fact that its rigid internal casing 1 has annular reinforcements 6 on at least one of its extremities, and by the fact that at least one of the plane end surfaces 5 of said rigid internal casing 1 has at least one projecting element 18, 19, realized in accordance with the process disclosed herein.

Another feature of the invention resides broadly in an elastic joint, characterized by the fact that the projecting element supported by the plane end surface 5 of the rigid internal casing 1 is constituted by at least one projecting cylindrical rib 18, concentric to the axis of revolution of the elastic joint.

Yet another feature of the invention resides broadly in an elastic joint, characterized by the fact that the projecting element supported by the plane end surface 5 of the rigid internal casing 1 is formed by radial grooves in relief.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A method for the manufacture of an elastic joint, said elastic joint including an internal casing member, said internal casing member having an exterior surface, an interior surface defining a throughgoing bore passing through said internal casing member and a central axis, said elastic joint also including an external casing member, said external casing member having an exterior surface, an interior surface defining a throughgoing bore passing through said external casing member and a central axis, and said elastic joint also including an elastomeric compound positioned between said exterior surface of said internal casing member and said interior surface of said external casing member, said method for the manufacture of said elastic joint comprising the steps of:

providing said internal casing member, said internal casing member having an end portion, said end portion having an interior portion and an end surface;

providing said external casing member;

providing said elastomeric compound;

positioning said external casing member, said internal casing member and said elastomeric compound by molding said elastomeric compound about said internal casing member such that:

said external casing member at least partially surrounds and bonds with said elastomer compound;

said elastomer compound bonds with said internal casing member; and said elastomeric compound is situated between said exterior surface of said internal casing member and said interior surface of said external casing member, thereby forming a molded blank comprising said external casing member, said internal casing member and said elastomeric compound;

providing a forming machine for shaping said end portion of said internal casing member, said forming machine comprising an internal die member;

radially expanding said interior portion of said end portion of said internal casing member by operating said forming machine, when said formed molded blank is in said forming machine, to thereby form an annular reinforcement on said end portion of said internal casing member, said step of radially expanding said end portion of said internal casing member being carried out by:

contacting a first portion of said internal die member of said forming machine at a plurality of positions at different times with said interior portion of said end portion of said internal casing member while said molded blank is mounted in said forming machine, thereby enlarging a diameter of said interior portion of said end portion; and contacting a second portion of said internal die member of said forming machine at a plurality of positions at different times with said end surface of said end portion of said internal casing member while said molded blank is mounted in said forming machine, thereby radially thickening said end portion of said internal casing member, wherein said radial thickening is thickening in a direction outwardly from said interior portion of said end portion of said internal casing member along radii of said internal casing member;

said step of radially expanding said interior portion of said end portion of said internal casing member being carried out subsequent to said positioning of said external casing member, of said internal casing member and of said elastomeric compound to form said molded blank.

2. The method according to claim 1, wherein said step of contacting said internal die member at a plurality of positions at different times with said interior portion of said end portion of said internal casing is carried out by contacting said internal die member a plurality of times with said interior portion of said end portion of said internal casing member such that the application of force of said internal die member against said interior portion of said end portion of said internal casing member is along an axis that is oblique with respect to said central axis of said internal casing member, and such that said oblique axis of application of force of said internal die member against said interior portion of said end portion of said internal casing member describes at least a portion of a conical surface.

3. The method according to claim 2, said method comprising the additional step of positioning an external die member against said exterior surface of said end portion of said integral casing member during said step of contacting said internal die member a plurality of times with said interior portion of said end portion of said internal casing member.

4. The method according to claim 3, wherein:
said internal die member comprises an internal forging die member;
wherein said application of force of said internal forging die member against said interior portion of said end portion of said internal casing member is applied tangentially to said interior portion of said end portion of said internal casing member by said internal forging die member;
wherein said internal forging die member makes a spot contact which is tangential with said interior portion of said end portion of said internal casing member;
wherein said step of contacting said internal die member a plurality of times with said interior portion of said end portion of said internal casing member causes an extrusion of a local portion of said interior portion of said end portion of said internal casing member;
wherein said movement of said internal die member is at least a reciprocating movement along said oblique axis; and
wherein said method additionally comprises the further steps of:
moving said internal forging die member around said oblique axis, wherein said oblique axis has a low-angle conical trajectory with respect to said central axis of said internal casing member;
rotating said oblique axis having a low-angle conical trajectory about said central axis of said internal casing member; and
applying a reaction force to react against said application of force of said internal forging die member against said interior portion of said end portion of said internal casing member, said reaction force being exerted on a planar end surface of said internal casing member that is opposite to said end portion of said internal casing member having said interior portion.

5. The method according to claim 4, said method additionally comprising the additional step of, following said step of positioning said external casing member, said internal casing member and said elastomeric compound such that said external casing member at least partially surrounds said internal casing member and such that said elastomeric compound is situated between said exterior surface of said internal casing member and said interior surface of said external casing member, radially expanding said internal casing member over a substantial portion of its axial length to thereby prestress said elastomeric compound.

6. The method according to claim 5, said method comprising the additional steps of, following said step of positioning said external casing member, said internal casing member and said elastomeric compound such that said external casing member at least partially surrounds said internal casing member and such that said elastomeric compound is situated between said exterior surface of said internal casing member and said interior surface of said external casing member, radially compressing said external casing member over a substantial portion of its axial length to thereby prestress said elastomeric compound.

7. The method according to claim 6, wherein said step of radially compressing said external casing member is performed after said step of radially expanding said end portion of said internal casing member.

8. The method according to claim 7, wherein said step of radially compressing said external casing member is carried out by radially hammering said exterior surface of said external casing member.

9. The method according to claim 8, wherein:
said internal casing member and said external casing member are positioned such that an annular space is defined between said exterior surface of said internal casing member and said interior surface of said external casing member; and
wherein said step of positioning said external casing member, said internal casing member and said elastomeric compound comprises the step of depositing said elastomeric compound within said annular space defined between said exterior surface of said internal casing member and said interior surface of said external casing member.

10. The method according to claim 4, wherein said elastic joint additionally includes an intermediate casing member positioned coaxial with and intermediate between said internal casing member and said external casing member, and wherein said method additionally comprises the further steps of:
situating said elastomeric compound both between said external casing member and said intermediate casing member and between said intermediate casing member and said internal casing member; and
radially expanding said internal casing member over a substantial portion of its axial length to thereby prestress said elastomeric compound;
said step of radially expanding said internal casing member over a substantial portion of its axial length being carried out subsequent to said step of radially expanding said interior portion of said end portion of said internal casing member.

11. The method according to claim 9, wherein said exterior and interior surfaces of said internal casing member define a substantially annular end face of said internal casing member, and wherein:
said first portion of said internal forging die member comprises a protruding central portion and said second portion of said internal forging die member comprises a radially extending annular portion, said protruding central portion being surrounded by a radially extending annular portion that extends radially from said protruding central portion;
said protruding central portion of said internal forging die member is configured to extend at least partially into said throughgoing bore defined by said interior surface of said internal casing member, and said radially extending annular portion of said internal riveting die member being configured to contact said substantially annular end face of said internal casing member; and
said method further comprises the additional step of forming at least one surface-relieved portion on said radially extending portion of said internal forging die member such that at least one axially extending protrusion is formed on said annular reinforcement on said axially protruding end portion of said internal casing member by and during said step of contacting said second portion of said internal die member at a plurality of positions at different times with said end surface of said internal casing member.

12. The method according to claim 11, wherein said at least one surface-relieved portion formed on said radially extending portion of said internal forging die member comprises a substantially arcuate-shaped surface-relieved portion, and wherein said at least one axially extending protrusion formed on said annular reinforcement on said axially protruding end portion of said internal casing member comprises a correspondingly substantially arcuate-shaped axially extending protrusion.

13. The method according to claim 11, wherein said at least one surface-relieved portion formed on said radially extending portion of said internal forging die member comprises a substantially radially extending surface-relieved portion, and wherein said at least one axially extending protrusion formed on said annular reinforcement on said axially protruding end portion of said internal casing member comprises a correspondingly substantially radially extending protrusion.

14. The method according to claim 9, wherein said exterior and interior surfaces of said internal casing member define a substantially annular end face of said internal casing member, and wherein said method further comprises the additional steps of:
shaping said internal forging die member such that it comprises a protruding central portion surrounded by an annular portion extending radially from said protruding central portion;
said protruding central portion of said internal forging die member being configured to extend at least partially into said throughgoing bore defined by said interior surface of said internal casing member and said radially extending annular portion of said internal forging die member being configured to contact said substantially annular end face of said internal casing member; and
forming at least two surface-relieved portions on said radially extending portion of said internal forging die member such that at least two axially extending protrusions are formed on said annular reinforcement on said axially protruding end portion of said internal casing member during said step of contacting said internal forging die member at a plurality of positions at different times with said internal casing member;
a first of said surface-relieved portions formed on said radially extending portion of said internal forging die member comprising a substantially arcuate-shaped surface-relieved portion, and a first of said axially extending protrusions formed on said annular reinforcement on said axially protruding end portion of said internal casing member comprising a correspondingly substantially arcuate-shaped axially extending protrusion; and
a second of said surface-relieved portions formed on said radially extending portion of said internal forging die member comprising a substantially radially extending surface-relieved portion, and a second of said axially extending protrusions formed on said annular reinforcement on said axially protruding end portion of said internal casing member comprising a correspondingly substantially radially extending protrusion.

15. The method according to claim 14,
wherein said elastic joint additionally includes an intermediate casing member positioned coaxial with and intermediate between said internal casing member and said external casing member;
wherein said method additionally comprises the further step of depositing said elastomeric compound both between said external casing member and said intermediate casing member and between said intermediate casing member and said internal casing member, said step of depositing said elastomeric compound comprising providing an intimate bond between said elastomeric compound and said intermediate casing member;
wherein said positioning and molding of said external casing member, of said internal casing member and of said elastomeric compound to form said molded blank comprises:
providing an intimate bond between said elastomeric compound and said external casing member; and
providing an intimate bond between said elastomeric compound and said internal casing member;
wherein said method further comprises the additional step of radially expanding said axially protruding end portion of said internal casing member that extends beyond said axial end of said external casing member to a degree where at least a portion of the external surface of said internal casing member extends radially beyond at least said interior surface of said intermediate casing member;
wherein said internal forging die member makes a spot contact which is tangential with said axially protruding end portion of said internal casing member;
wherein said protruding central portion of said internal forging die is conically shaped;
wherein both of said at least one arcuate-shaped protrusion and said at least one radially extending protrusion formed on said protruding end portion of said internal casing member protrude axially up to about 0.5 mm;
wherein both of said at least one arcuate-shaped protrusion and said at least one radially extending protrusion formed on said protruding end portion of said internal casing member have a width of from about 0.3 to about 0.4 mm;
wherein said contacting said internal die member a plurality of times with said interior portion of said end portion of said internal casing member comprises contacting said internal die member substantially with said interior portion of said end portion of said internal casing member; and
wherein said application of force of said internal forging die member against said interior portion of said end portion of said internal casing member is exerted along different axes relative to said end portion of said internal casing member at different times.

16. The method according to claim 10, wherein:
said internal casing member and said external casing member are positioned such that they have substantially coaxial central axes, such that at least one end portion of said internal casing member extends axially beyond at least one axial end of said external casing member to thereby create an axially protruding end portion of said internal casing member; and said step of radially expanding said internal portion of said internal casing member comprises radially expanding said axially protruding end portion of said internal casing member that extends beyond said axial end of said external casing member to a degree where at least a portion of the external surface of said internal casing member extends radially beyond at least said interior surface of said intermediate casing member.

* * * * *

UNITED STATES PATENT AND TRADEMARK OFFICE
CERTIFICATE OF CORRECTION

PATENT NO. : 5,301,414
DATED : April 12, 1994
INVENTOR(S) : Michel GAUTHERON

It is certified that error appears in the above-indentified patent and that said Letters Patent is hereby corrected as shown below:

In Claim 3, column 15, line 7, after 'said', first occurence, delete "integral" and insert --internal--.

In Claim 14, column 17, line 67, after 'said' insert --end portion of said--.

Signed and Sealed this

Seventeenth Day of September, 1996

Attest:

BRUCE LEHMAN

*Attesting Officer*  *Commissioner of Patents and Trademarks*